(12) United States Patent
Gao et al.

(10) Patent No.: US 11,459,710 B2
(45) Date of Patent: Oct. 4, 2022

(54) CONTINUOUS ASPHALT MIXTURE PRODUCTION PLANT BASED ON DOUBLE-HORIZONTAL-SHAFT FORCED MIXING

(71) Applicant: FUJIAN TIETUO MACHINERY CO., LTD., Quanzhou (CN)

(72) Inventors: Daile Gao, Quanzhou (CN); Guoqiang Gao, Quanzhou (CN); Pixian Guo, Quanzhou (CN); Zuoyao Yin, Quanzhou (CN)

(73) Assignee: FUJIAN TIETUO MACHINERY CO., LTD., Quanzhou (CN)

( * ) Notice: Subject to any disclaimer, the term of this patent is extended or adjusted under 35 U.S.C. 154(b) by 810 days.

(21) Appl. No.: 16/299,112

(22) Filed: Mar. 11, 2019

(65) Prior Publication Data
US 2019/0226162 A1    Jul. 25, 2019

(30) Foreign Application Priority Data
Mar. 24, 2018  (CN) .......................... 201810248746.2

(51) Int. Cl.
*E01C 19/10*    (2006.01)
*B01F 27/61*    (2022.01)
(Continued)

(52) U.S. Cl.
CPC ........ *E01C 19/104* (2013.01); *B01F 27/0723* (2022.01); *B01F 27/0726* (2022.01);
(Continued)

(58) Field of Classification Search
CPC .......... B01F 35/75415; B01F 35/71731; B01F 27/702; B01F 33/811; B01F 27/0723;
(Continued)

(56) References Cited

U.S. PATENT DOCUMENTS

| 1,189,700 A | * | 7/1916 | Kerlin | ..................... E01C 19/48 366/139 |
| 2,572,068 A | * | 10/1951 | Sommer | .................. B01J 2/006 106/38.8 |

(Continued)

FOREIGN PATENT DOCUMENTS

| CN | 102335960 | * | 2/2010 | ............... B28C 5/20 |
| CN | 102441940 | * | 5/2012 | ............... B28C 5/08 |

(Continued)

*Primary Examiner* — James R Bidwell
(74) *Attorney, Agent, or Firm* — Bayramoglu Law Offices LLC

(57) ABSTRACT

A continuous asphalt mixture production plant based on double-horizontal-shaft forced mixing includes a cold aggregate bin, a continuous aggregate conveying and metering system, a drying drum, an aggregate elevator, a double-horizontal-shaft continuous mixing host, a continuous asphalt metering and conveying system, a continuous powder conveying and metering system and a finished product bin. The double-horizontal-shaft continuous mixing host includes a first double-horizontal-shaft mixing cylinder and a second double-horizontal-shaft mixing cylinder connected in series. The first double-horizontal-shaft mixing cylinder is provided with an aggregate inlet, an asphalt inlet, a powder inlet and a first discharging port, and the second double-horizontal-shaft mixing cylinder is provided with a mixture inlet and a second discharging port. The aggregate inlet, the asphalt inlet and the powder inlet are respectively connected with an outlet of the aggregate elevator, the continuous asphalt metering and conveying system and the continuous powder conveying and metering system correspondingly.

10 Claims, 8 Drawing Sheets

(51) Int. Cl.
*B01F 27/702* (2022.01)
*B01F 27/072* (2022.01)
*B01F 33/81* (2022.01)
*B01F 35/71* (2022.01)
*B01F 35/75* (2022.01)
*B65G 65/46* (2006.01)
*B65G 15/00* (2006.01)

(52) U.S. Cl.
CPC ............ *B01F 27/61* (2022.01); *B01F 27/702* (2022.01); *B01F 33/811* (2022.01); *B01F 35/71731* (2022.01); *B01F 35/75415* (2022.01); *B65G 65/46* (2013.01); *E01C 19/1045* (2013.01); *E01C 19/1068* (2013.01); *B65G 15/00* (2013.01); *B65G 2201/042* (2013.01); *B65G 2203/0241* (2013.01); *B65G 2203/0258* (2013.01); *C08J 2395/00* (2013.01); *E01C 19/10* (2013.01); *E01C 19/1063* (2013.01); *E01C 19/1072* (2013.01)

(58) Field of Classification Search
CPC .. B01F 27/61; B01F 27/0726; E01C 19/1045; E01C 19/104; E01C 19/1068; C08J 2395/00; B65G 65/46; B65G 15/00; B65G 2203/0241; B65G 2201/042; B65G 2203/0258

USPC ............................................ 366/6
See application file for complete search history.

(56) References Cited

U.S. PATENT DOCUMENTS

| 4,153,471 | A | * | 5/1979 | Mendenhall | ........ E01C 19/1036 423/210 |
|---|---|---|---|---|---|
| 4,921,730 | A | * | 5/1990 | Sasaki | ................ E01C 19/1004 427/403 |
| 5,209,563 | A | * | 5/1993 | Swisher, Jr. | ........ E01C 19/1068 222/145.5 |
| 5,340,396 | A | | 8/1994 | Meegoda | |

FOREIGN PATENT DOCUMENTS

| CN | 104179109 | A | 12/2014 | |
| CN | 113774757 | * | 12/2021 | ............ E01C 19/10 |
| DE | 29700709 | U1 | 4/1998 | |
| EP | 0211103 | A1 | 2/1987 | |
| EP | 0672791 | A1 | 9/1995 | |
| EP | 3221517 | A1 | 9/2017 | |
| WO | 0185322 | A1 | 11/2001 | |
| WO | 2012122659 | A1 | 9/2012 | |
| WO | 2014027918 | A1 | 2/2014 | |

* cited by examiner

_(1)_

CONTINUOUS ASPHALT MIXTURE PRODUCTION PLANT BASED ON DOUBLE-HORIZONTAL-SHAFT FORCED MIXING

CROSS REFERENCE TO THE RELATED APPLICATIONS

This application is based upon and claims priority to Chinese Patent Application No. 2018/0248746.2, filed on Mar. 24, 2018, the entire contents of which are incorporated herein by reference.

TECHNICAL FIELD

The invention relates to the technical field of asphalt production plants, in particular to a continuous asphalt mixture production plant based on double-horizontal-shaft forced mixing.

BACKGROUND

Asphalt mixture mixing plants are generally divided into a batch type and a continuous type according to mixing process. The metering, mixing and discharging processes of the batch asphalt mixture mixing plant are intermittent and are generally performed circularly according to a certain mixing cycle, which has the following advantages: 1. the batch metering process can ensure high metering accuracy; and 2, uniformity of mixing can be ensured. However, the batch asphalt mixture mixing plant also has the following disadvantages: 1. since the batch plant needs to perform complicated actions such as batch metering, discharging, re-metering and so on, its output is relatively low due to the influence of the cycle; 2. in order to realize batch metering and mixing, there must be mechanisms such as a buffer hopper, a metering hopper, a sensor and a discharge door, so that the structure of the plant is complex and the manufacturing cost is relatively high; 3. the batch discharging process will lead to intermittent high and low changes in the air pressure at sealing positions of the plant, which is easy to cause environmental protection problems such as ash emission; and 4. raw materials are divided into several specifications when entering the factory. They are screened again after being dried by plant and are mixed together again in a batch mixing cylinder. If the quality of the raw materials is not taken into consideration, there is a process of repeated mixing and separation from the viewpoint of the overall mixing process of the batch plant, which wastes energy.

At present, there are also some continuous asphalt mixture mixing plants, but due to unreasonable structural design, the mixing time of the mixture in the mixing plants is short, the mixing effect is poor, and uneven asphalt mixture is easy to be produced. In addition, existing continuous weighing of aggregate is affected by the tension of a feeding belt and position differences of floating support rollers, which leads to low metering accuracy, thus resulting in large asphalt-aggregate ratio error of a finished material. Besides, the calibration of a powder metering scale and an asphalt flow meter must be stopped, affecting the production efficiency of the mixing plant and the stability of the discharging quality.

SUMMARY

The invention provides a continuous asphalt mixture production plant based on double-horizontal-shaft forced mixing, which mainly aims to overcome the defects of existing continuous asphalt mixture production plants such as poor mixing effect, easy production of uneven asphalt mixture and the like.

The invention adopts the following technical scheme:

A continuous asphalt mixture production plant based on double-horizontal-shaft forced mixing comprises a cold aggregate bin, a continuous aggregate conveying and metering system, a drying drum, an aggregate elevator, a double-horizontal-shaft continuous mixing host, a continuous asphalt metering and conveying system, a continuous powder conveying and metering system and a finished product bin, wherein the cold aggregate bin is connected with a feeding end of the drying drum through the continuous aggregate conveying and metering system; a discharging end of the drying drum is connected with the double-horizontal-shaft continuous mixing host through the aggregate elevator; the double-horizontal-shaft continuous mixing host comprises a first double-horizontal-shaft mixing cylinder and a second double-horizontal-shaft mixing cylinder which are connected in series; the first double-horizontal-shaft mixing cylinder is provided with an aggregate inlet, an asphalt inlet, a powder inlet and a first discharging port, and the second double-horizontal-shaft mixing cylinder is provided with a mixture inlet and a second discharging port; the aggregate inlet, the asphalt inlet and the powder inlet are respectively connected with an outlet of the aggregate elevator, the continuous asphalt metering and conveying system and the continuous powder conveying and metering system correspondingly; and the first discharging port is interfaced with the mixture inlet, and the second discharging port is connected with the finished product bin.

Further, the first double-horizontal-shaft mixing cylinder and the second double-horizontal-shaft mixing cylinder are both mounted obliquely, with one end of the first double-horizontal-shaft mixing cylinder provided with the aggregate inlet being lower than the other end provided with the first discharging port, and one end of the second double-horizontal-shaft mixing cylinder provided with the mixture inlet being lower than the other end provided with the second discharging port.

Further, the first double-horizontal-shaft mixing cylinder and the second double-horizontal-shaft mixing cylinder are each provided with two mixing shafts which rotate parallelly, synchronously and in opposite directions. A plurality of feed mixing groups are arranged on each mixing shaft at intervals, and a return mixing group is arranged after every two successive feed mixing groups. The feed mixing group comprises a plurality of mixing arms vertically arranged at intervals along the same circumferential surface of the mixing shaft, and feed blades mounted on the mixing arms. The return mixing group comprises a plurality of mixing arms vertically arranged at intervals along the same circumferential surface of the mixing shaft, and return blades mounted on the mixing arms. The feed blades and the return blades are of the same structure and are mounted in opposite directions, and adjacent two groups of feed blades or adjacent feed blades and return blades on the same mixing shaft are alternately arranged at intervals.

Further, the continuous aggregate conveying and metering system comprises an aggregate belt conveyor, a full-floating weighing belt scale and an inclined belt conveyor. An inlet of the aggregate belt conveyor is arranged below the cold aggregate bin. The full-floating weighing belt scale comprises a belt metering scale and a weighing sensor on which the belt metering scale is suspended. A feeding inlet of the belt metering scale is interfaced with an outlet of the aggregate belt conveyor, and a discharging port of the belt metering scale is interfaced with an inlet of the inclined belt conveyor.

Further, the continuous asphalt metering and conveying system comprises an asphalt storage tank, a first asphalt pump, an intermediate transition metering hopper, a second asphalt pump and an asphalt flow meter. The intermediate transition first metering hopper is arranged between the asphalt storage tank and the first double-horizontal-shaft mixing cylinder. An inlet pipeline is arranged between the asphalt storage tank and the intermediate transition metering hopper, and an outlet pipeline is arranged between the intermediate transition metering hopper and the first double-horizontal-shaft mixing cylinder. The first asphalt pump and the second asphalt pump are respectively arranged on the inlet pipeline and the outlet pipeline, and the asphalt flow meter is arranged on the outlet pipeline between the second asphalt pump and the first double-horizontal-shaft mixing cylinder.

Further, a front end of the inlet pipeline is connected with the asphalt storage tank, and a tail end of the inlet pipeline is connected with the intermediate transition metering hopper but does not contact with the intermediate transition metering hopper. A front end of the outlet pipeline is connected with the intermediate transition metering hopper but does not contact with the intermediate transition metering hopper.

Further, the continuous powder conveying and metering system comprises a powder storage tank, an auger feeder, a pneumatic butterfly valve, an intermediate transition metering hopper, a powder discharge screw conveyor and a powder metering screw scale. A discharging port of the powder storage tank is connected with an inlet of the intermediate transition metering hopper through the auger feeder and the pneumatic butterfly valve. The powder discharge screw conveyor is obliquely arranged, an inclined lower end of the powder discharge screw conveyor is interfaced with the bottom of the intermediate transition metering hopper, and an inclined upper end of the powder discharge screw conveyor is interfaced with a feeding port of the powder metering screw scale. A discharging port of the powder metering screw scale is connected with the first double-horizontal-shaft mixing cylinder.

Further, the drying drum, the aggregate elevator, the first double-horizontal-shaft mixing cylinder, the second double-horizontal-shaft mixing cylinder and the finished product bin are all connected by flanges and are communicated with each other internally.

Further, the continuous asphalt mixture production plant further comprises a dust collector, a burner is arranged on the drying drum, and a tail gas outlet is arranged on the top of the drying drum and is connected to the dust collector.

Further, the continuous asphalt mixture production plant further comprises a control system which is connected with the continuous aggregate conveying and metering system, the burner, the aggregate elevator, the double-horizontal-shaft continuous mixing host, the continuous asphalt metering and conveying system, the continuous powder conveying and metering system and the dust collector, respectively.

As can be seen from the above description of the structure of the present invention, the present invention has the following advantages over the prior art:

1. The asphalt mixture production plant of the present invention adopts two double-horizontal-shaft mixing cylinders connected in series, which not only has large output and long mixing time, but also realizes the effect of refluxing and mixing the materials in the mixing cylinders under the action of gravity during the mixing process due to the fact that the two double-horizontal-shaft mixing cylinders are arranged obliquely, thus prolonging the mixing time and improving the mixing uniformity of the previous and later materials.

2. The present invention is not affected by the cycles. Components are continuously associated together without waiting, and the output is large. The components operate synchronously according to the same processing capacity without the need for intermediate buffer devices and various sensors, and the plant cost is lower than that of the batch asphalt mixture mixing plant.

3. The components of the invention are seamlessly interfaced and communicated with each other, and asphalt smoke generated in the subsequent asphalt mixing and storage process enters the drying drum for incineration under the negative pressure of the dust collector, so that the environmental protection performance is good.

4. According to the invention, by means of the control system, the operating parameters of the devices are interrelated and linked with each other, allowing the air pressure in the plant to be relatively stable, thus the interface positions between various components do not cause ash generation due to intermittent air pressure changes, and the environmental protection performance is good.

DETAILED DESCRIPTION OF THE EMBODIMENTS

Hereinafter, specific embodiments of the present invention will be described with reference to the accompanying drawings. In order to fully understand the present invention, many details are described below, but it will be apparent to those skilled in the art that the present invention can be implemented without these details. Known components, methods and processes will not be described in detail below.

Figure 1:
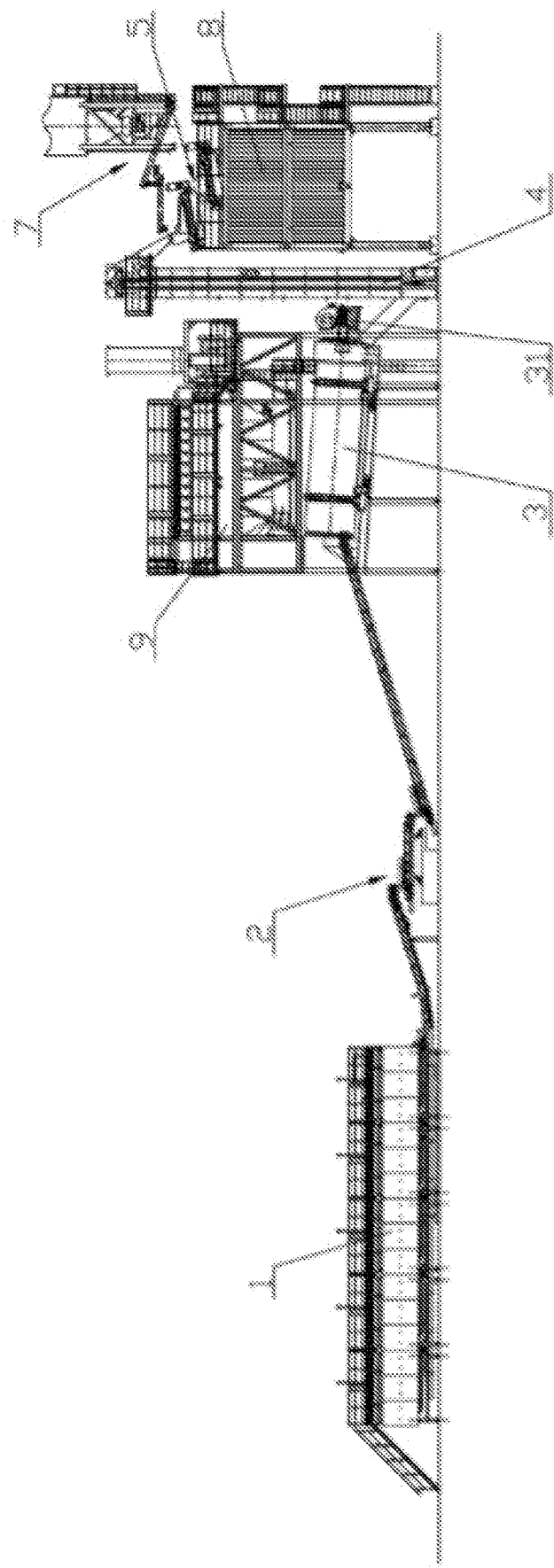
FIG. 1 is a schematic structural diagram of the present invention with a continuous asphalt metering and conveying system omitted.

Referring to FIG. 1, the continuous asphalt mixture production plant based on based on double-horizontal-shaft forced mixing comprises a cold aggregate bin 1, a continuous aggregate conveying and metering system 2, a drying drum 3, an aggregate elevator 4, a double-horizontal-shaft continuous mixing host 5, a continuous asphalt metering and conveying system, a continuous powder conveying and metering system 7 and a finished product bin 8. The cold aggregate bin 1 is connected with a feeding end of the drying drum 3 through the continuous aggregate conveying and metering system 2. A discharging end of the drying drum 3 is connected with the double-horizontal-shaft continuous mixing host 5 through the aggregate elevator 4, and a discharging port of the double-horizontal-shaft continuous mixing host 5 is connected with the finished product bin 8.

With continued reference to FIG. 1, the continuous asphalt mixture production plant further comprises a dust collector 9. A burner 31 is arranged on the drying drum 3. A tail gas outlet is provided on the top of the drying drum 3 and is connected to the dust collector 9.

The continuous asphalt mixture production plant of the invention further comprises a control system which is respectively connected with the continuous aggregate conveying and metering system 2, the burner 31, the aggregate elevator 4, the double-horizontal-shaft continuous mixing host 5, the continuous asphalt metering and conveying system, the continuous powder conveying and metering system 7 and the dust collector 8.

Figure 2:
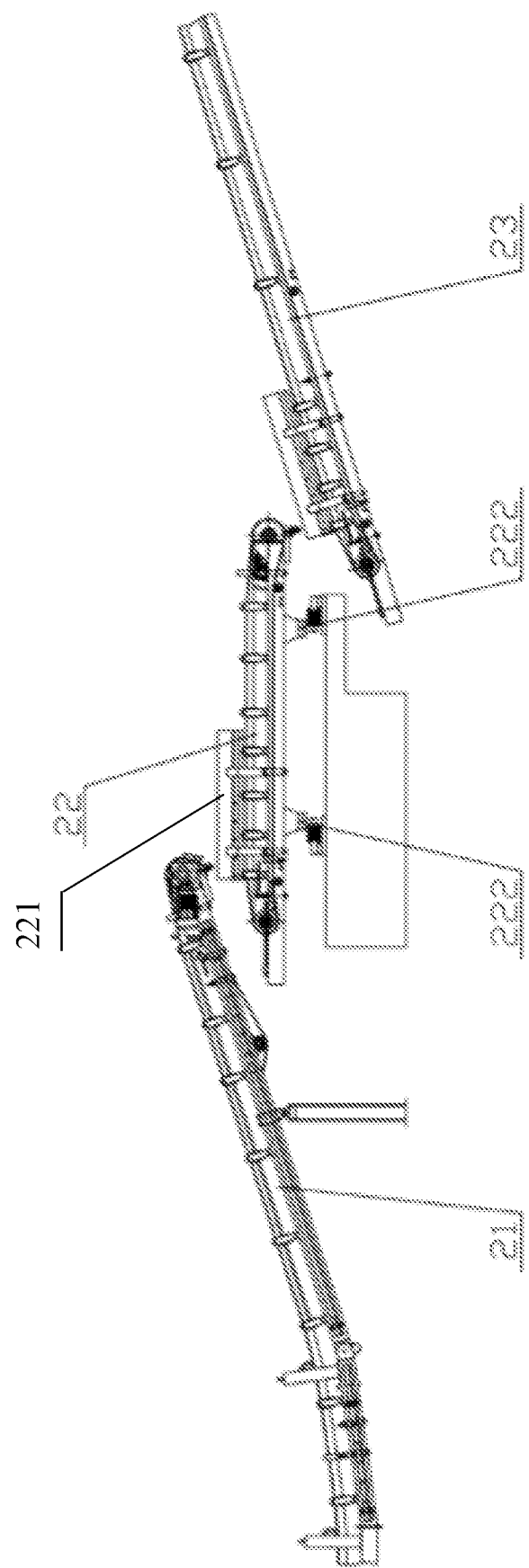
FIG. 2 is a schematic structural diagram of the continuous aggregate conveying and metering system of the present invention.

Referring to FIG. 2, the continuous aggregate conveying and metering system 2 comprises an aggregate belt conveyor 21, a full floating weighing belt scale 22 and an inclined belt conveyor 23. There are provided a plurality of cold aggregate bins 1. An inlet of the aggregate belt conveyor 21 is arranged below the cold aggregate bins 1. The full floating weighing belt scale 22 comprises a belt metering scale 221 and a weighing sensor 222 on which the belt metering scale 221 is suspended. Here, a plurality of weighing sensors 222 are provided which are uniformly distributed under the belt metering scales 221 to stably support the belt metering scales 221. An inlet of the belt metering scale 221 is interfaced with an outlet of the aggregate belt 21, and a discharging port of the belt metering scale 221 is interfaced with an inlet of the inclined belt conveyor 23.

Figure 3:
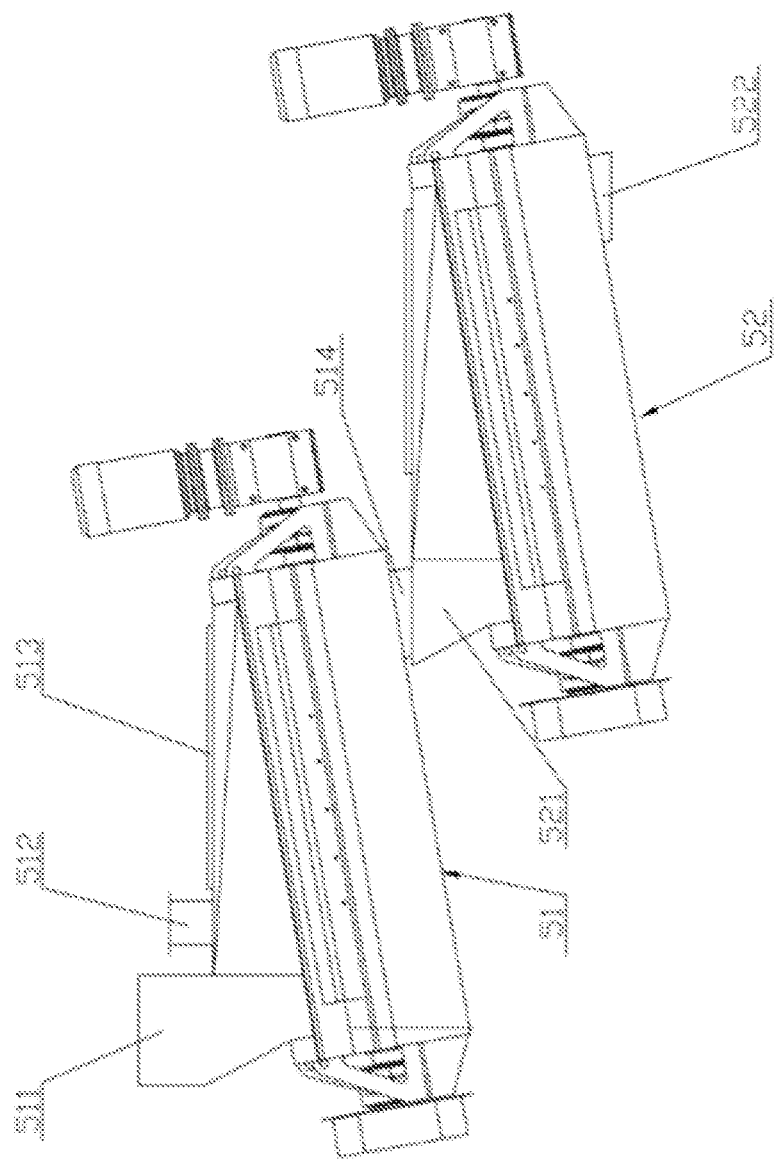
FIG. 3 is a schematic structural diagram of a double-horizontal-shaft continuous mixing host of the present invention.

Referring to FIG. 3, the double-horizontal-shaft continuous mixing host 5 comprises a first double-horizontal-shaft mixing cylinder 51 and a second double-horizontal-shaft mixing cylinder 52 which are connected in series. The first double-horizontal-shaft mixing cylinder 51 is provided with an aggregate inlet 511, an asphalt inlet 512, a powder inlet 513, and a first discharging port 514. The second double-horizontal-shaft mixing cylinder 52 is provided with a mixture inlet 521 and a second discharging port 522. The aggregate inlet 511, the asphalt inlet 512 and the powder inlet 513 are respectively connected with an outlet of the aggregate elevator 4, the continuous asphalt metering and conveying system 6 and the continuous powder conveying and metering system 7 in a corresponding way. The first discharging port 514 is interfaced with the mixture inlet 521, and the second discharging port 522 is connected with the finished product bin 8. The first discharging port 514 and the second discharging port 522 are both provided with a discharge door capable of adjusting an opening size.

The drying drum 3, the aggregate elevator 4, the first double-horizontal-shaft mixing cylinder 51, the second double-horizontal-shaft mixing cylinder 52 and the finished product bin 8 are all connected by flanges and are communicated with each other internally.

The first double-horizontal-shaft mixing cylinder 51 and the second double-horizontal-shaft mixing cylinder 52 are both mounted obliquely. The first double-horizontal-shaft mixing cylinder 51 has a central axis parallel to a central axis of the second double-horizontal-shaft mixing cylinder 52, and the two central axes form the same included angle with a horizontal plane, and the included angle is preferably an acute angle. One end of the first double-horizontal-shaft mixing cylinder 51 provided with the aggregate inlet 511 is lower than the other end provided with the first discharging port 514, and one end of the second double-horizontal-shaft mixing cylinder 52 provided with the mixture inlet 521 is lower than the other end provided with the second discharging port 522.

Figure 4:
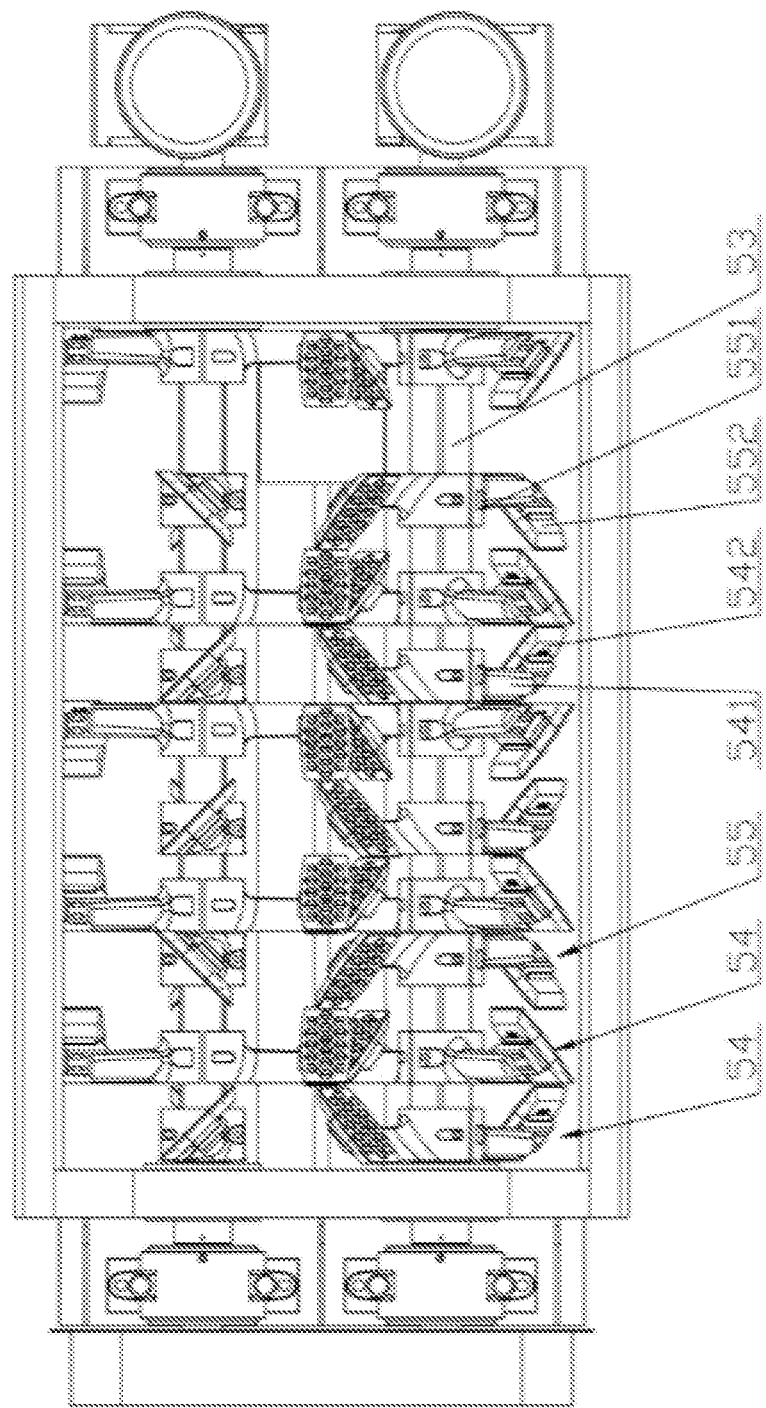
FIG. 4 is a schematic diagram of the internal structure of one double-horizontal-shaft mixing cylinder according to the present invention.

Referring to FIG. 4, the first double-horizontal-shaft mixing cylinder 51 and the second double-horizontal-shaft mixing cylinder 52 are each provided with two mixing shafts 53 which rotate parallelly, synchronously and in opposite directions. A plurality of feed mixing groups 54 are arranged on each mixing shaft 53 at intervals, and a return mixing group 55 is arranged after every two successive feed mixing groups 54. The feed mixing groups 54 on the two mixing shafts are arranged in a staggered manner. The feed mixing group 54 comprises a plurality of mixing arms 541 arranged vertically at intervals along the same circumferential surface of the mixing shaft 53, and feed blades 542 mounted on the mixing arms 541. The return mixing groups 55 on the two mixing shafts are also staggered, and the return mixing group 55 comprises a plurality of mixing arms 551 vertically arranged at intervals along the same circumferential surface of the mixing shaft 53 and return blades 552 mounted on the mixing arms 551. The feed blades 542 and the return blades 552 are of the same structure and are mounted in opposite directions, and the adjacent two groups of feed blades 542 or the adjacent feed blades 542 and the return blades 552 on the same mixing shaft 53 are alternately arranged at intervals.

Figure 5:
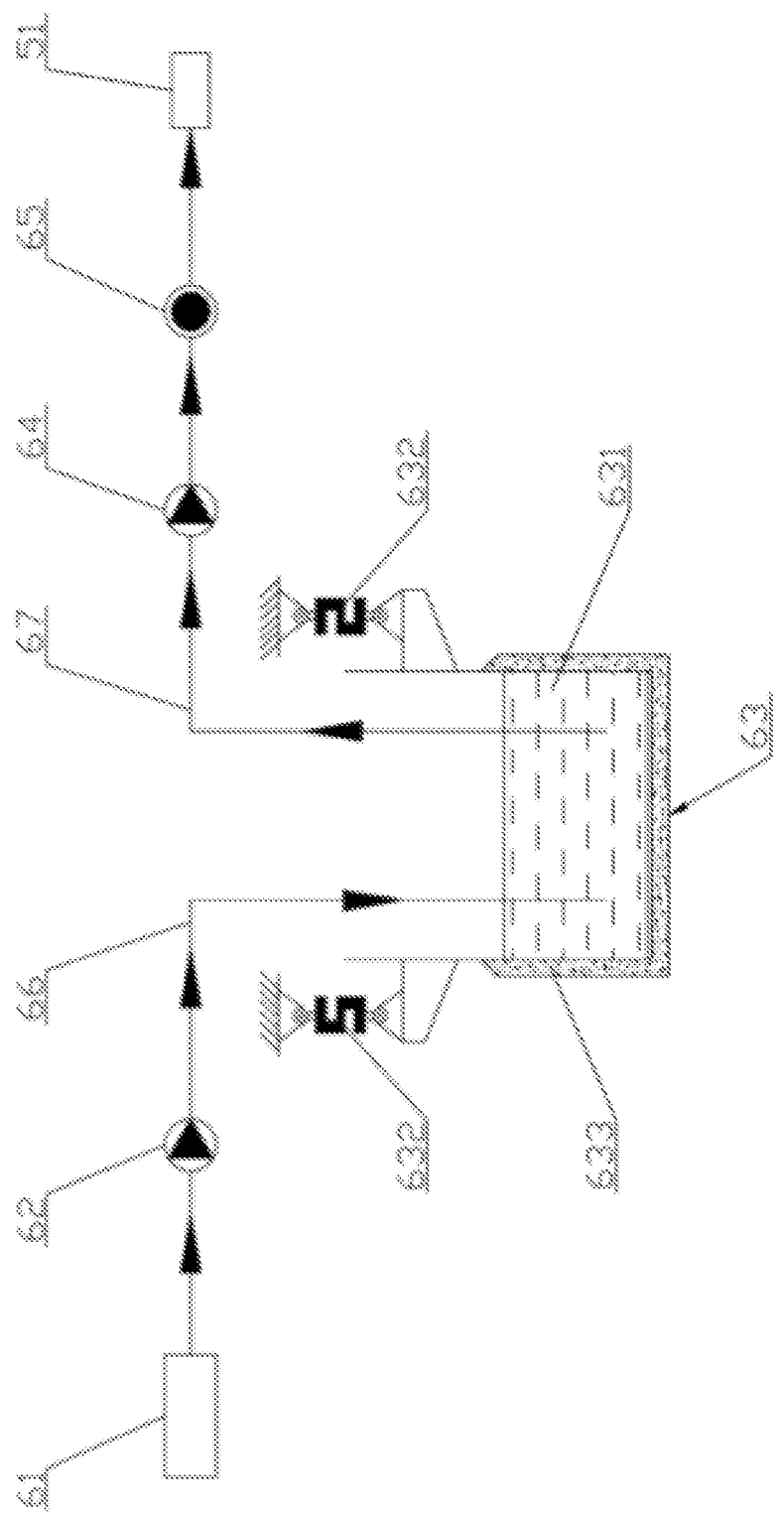
FIG. 5 is a schematic structural diagram of the continuous asphalt metering and conveying system of the present invention in a production state.

Referring to FIG. 5, the continuous asphalt metering and conveying system comprises an asphalt storage tank 61, a first asphalt pump 62, a first intermediate transition metering hopper 63, a second asphalt pump 64 and an asphalt flow meter 65. The first intermediate transition metering hopper 63 is arranged between the asphalt storage tank 61 and the first double-horizontal-shaft mixing cylinder 51. An inlet pipeline 66 is arranged between the asphalt storage tank 61 and the first intermediate transition metering hopper 63. An outlet pipeline 67 is provided between the first intermediate transition metering hopper 63 and the first double-horizontal-shaft mixing cylinder 51. The first asphalt pump 62 and the second asphalt pump 64 are respectively mounted on the inlet pipeline 66 and the outlet pipeline 67. The asphalt flow meter 65 is mounted on the outlet pipeline 67 between the second asphalt pump 64 and the first double-horizontal-shaft mixing cylinder 51.

A front end of the inlet pipeline 66 is connected with the asphalt storage tank 61, and a tail end of the inlet pipeline 66 is connected with the first intermediate transition metering hopper 63, but does not contact with a side wall and a bottom wall of the first intermediate transition metering hopper 63. A front end of the outlet pipeline 67 is connected to the first intermediate transition metering hopper 63, but does not contact the side wall and the bottom wall of the first intermediate transition metering hopper 63.

Referring to FIG. 5, the first intermediate transition metering hopper 63 includes a first metering hopper 631 and a first weighing sensor 632. Both sides of an upper part of the first metering hopper 631 are symmetrically provided with a first weighing sensor 632. The first metering hopper 631 is vertically hung below the first weighing sensors 632. A heat preservation and heating layer 633 is coated on an outer peripheral wall of the first metering hopper 631 to heat and preserve the heat of the asphalt in the first metering hopper 631.

Figure 6:
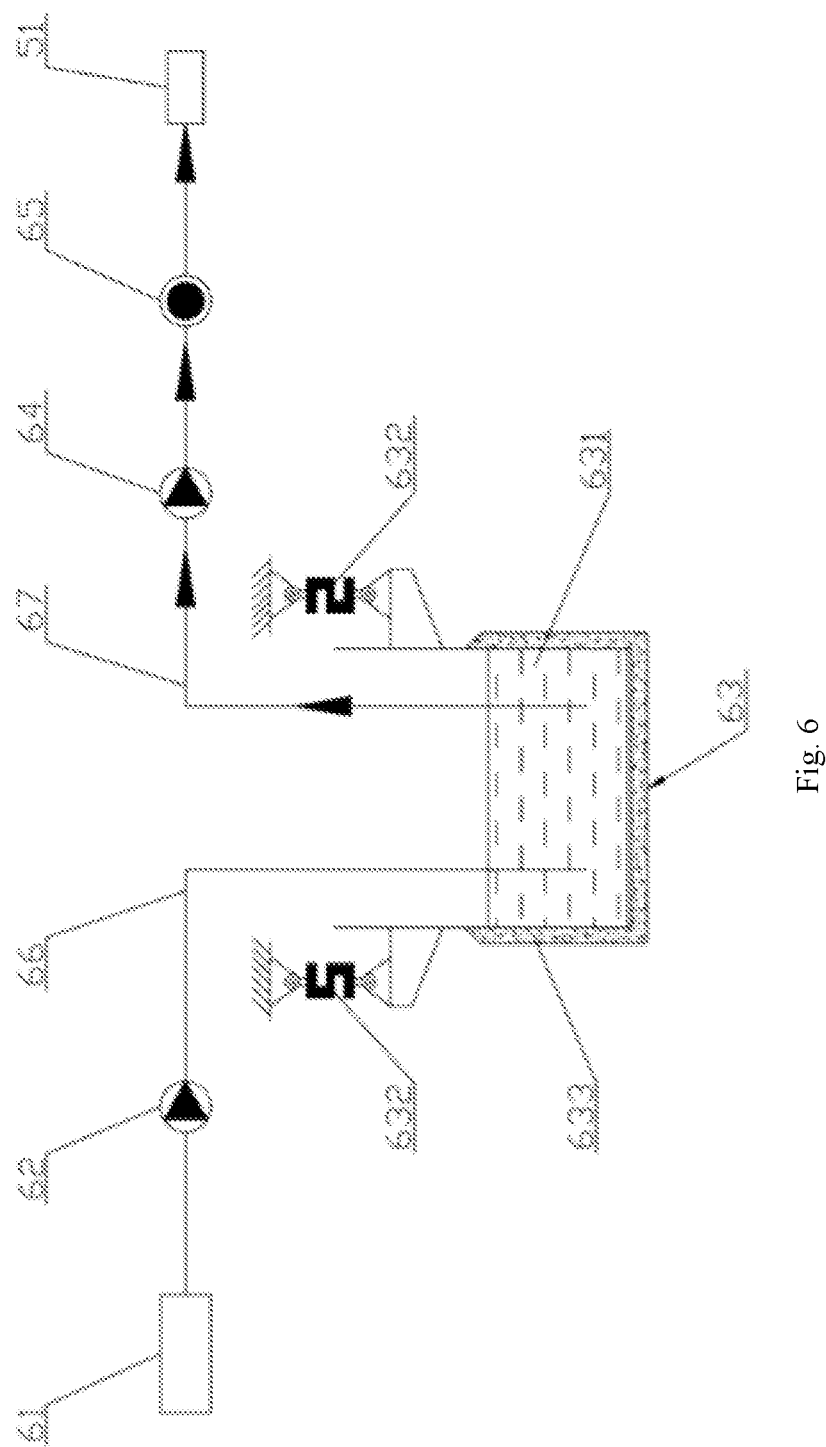
FIG. 6 is a schematic structural diagram of the continuous asphalt metering and conveying system of the present invention in a calibration state.

A calibration method of the continuous asphalt metering and conveying system comprises the following specific steps:

(1) referring to FIG. 5, the first asphalt pump 62 and the second asphalt pump 64 are operated with the same flow parameters, and the asphalt flow is controlled by the asphalt flow meter 65;

(2) referring to FIG. 6, the first asphalt pump 62 stops working, while the second asphalt pump 64 continues to operate with the original flow parameters, the weight of the asphalt in the first intermediate transition metering hopper 63 gradually decreases, and the speed at which the weight of the asphalt decreases in the first intermediate transition metering hopper 63 is obtained through calculation by the control system.

(3) the speed of asphalt weight decrease in the first intermediate transition measuring hopper 63 obtained in step (2) is compared with the measurement data of the asphalt flow meter 65; and (4) if there is an error between the measurement data of the asphalt flow meter 65 and the speed of asphalt weight decrease in the first intermediate transition measuring hopper 63, the parameters of the asphalt flow meter 65 are automatically corrected by the control system.

Figure 7:
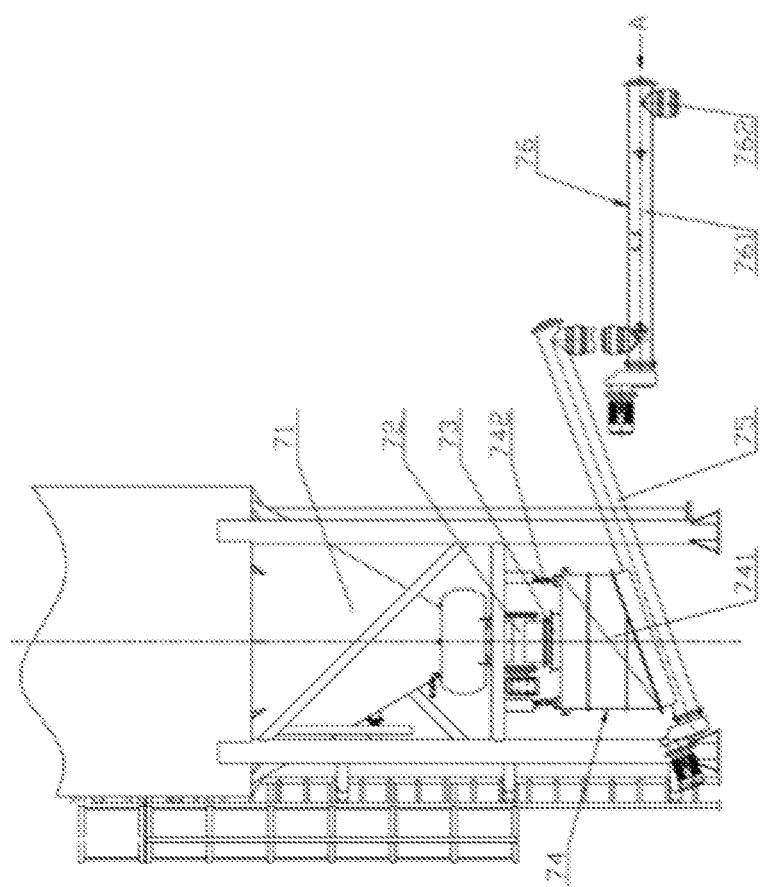
FIG. 7 is a schematic structural diagram of the continuous powder conveying and metering system of the present invention.

Referring to FIG. 7, the continuous powder conveying and metering system 7 comprises a powder storage tank 71, an auger feeder 72, a pneumatic butterfly valve 73, a second intermediate transition metering hopper 74, a powder discharge screw conveyor 75 and a powder metering screw scale 76. A discharging port of the powder storage tank 71 is connected with an inlet of the second intermediate transition metering hopper 74 through the auger feeder 72 and the pneumatic butterfly valve 73. The powder discharge screw conveyor 75 is obliquely arranged, an inclined lower end of the powder discharge screw conveyor 75 is interfaced with the bottom of the second intermediate transition metering hopper 74, and an inclined upper end of the powder discharge screw conveyor 75 is interfaced with a feeding port of the powder metering screw scale 76. A discharging port of the powder metering screw scale 76 is connected with the first double-horizontal-shaft mixing cylinder 51.

Referring to FIG. 7, the second intermediate transition metering hopper 74 includes a second metering hopper 741 and a second weighing sensor 742, and the metering hopper 741 is suspended below the second weighing sensor 742. The second weighing sensor 742 can weigh the powder in the second metering hopper 741 in real time.

Figure 8:
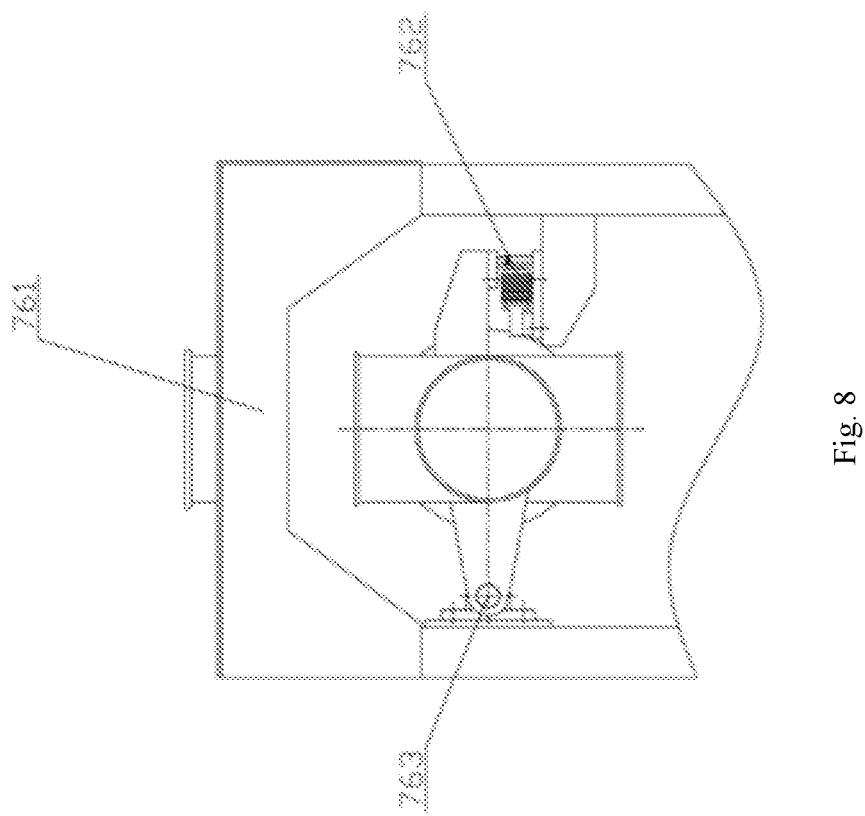
FIG. 8 is a schematic structural diagram in the direction of A in FIG. 7.

Referring to FIGS. 7 and 8, the powder metering screw scale 76 consists of a screw conveyor 761 and a third weighing sensor 762. The screw conveyor 761 is disposed completely floating on the third weighing sensor 762. In particular, the screw conveyor 761 adopts a three-point support structure, with one support point being provided with the third weighing sensor 762, and the other two support points being provided with living hinges 763. When the change of the weight of the powder in the screw conveyor 761 causes the pressure of the screw conveyor 761 on the three supporting points to change, the weighing process of the powder metering screw scale 76 is realized.

When the continuous powder conveying and metering system 7 performs calibration, the pneumatic butterfly valve 73 is closed. With the operation of the powder discharge screw conveyor 75 for the second intermediate transition metering hopper 274, the weight of the powder in the second intermediate transition metering hopper 274 gradually decreases. An actually measured output of the powder discharge screw conveyor 75 at the bottom of the second intermediate transition metering hopper 274 is calculated by detecting the speed at which the weight of the powder in the second intermediate transition metering hopper 274 gradually decreases, and the actually measured output is compared with the output parameters of the powder metering screw scale 76. If there is any inconsistency after comparison, the correction parameters of the powder metering screw scale 76 are automatically modified to be consistent with the measured values.

The above are merely specific embodiments of the present invention, but the design concept of the present invention is not limited thereto. Any non-substantial modification of the present invention using this concept shall be regarded as an act violating the protection scope of the present invention.

The invention claimed is:

1. A continuous asphalt mixture production plant based on a double-horizontal-shaft forced mixing, comprising:
   a cold aggregate bin, a continuous aggregate conveying and metering system, a drying drum, an aggregate elevator, a double-horizontal-shaft continuous mixing host, a continuous asphalt metering and conveying system, a continuous powder conveying and metering system and a finished product bin;
   wherein, the cold aggregate bin is connected with a feeding end of the drying drum through the continuous aggregate conveying and metering system;
   a discharging end of the drying drum is connected with the double-horizontal-shaft continuous mixing host through the aggregate elevator;
   the double-horizontal-shaft continuous mixing host comprises a first double-horizontal-shaft mixing cylinder and a second double-horizontal-shaft mixing cylinder connected in series;
   the first double-horizontal-shaft mixing cylinder is provided with an aggregate inlet, an asphalt inlet, a powder inlet and a first discharging port, and the second double-horizontal-shaft mixing cylinder is provided with a mixture inlet and a second discharging port;
   the aggregate inlet, the asphalt inlet and the powder inlet are respectively connected with an outlet of the aggregate elevator, the continuous asphalt metering and conveying system, and the continuous powder conveying and metering system correspondingly; and
   the first discharging port is interfaced with the mixture inlet, and the second discharging port is connected with the finished product bin.

2. The continuous asphalt mixture production plant based on double-horizontal-shaft forced mixing according to claim 1, wherein, the first double-horizontal-shaft mixing cylinder and the second double-horizontal-shaft mixing cylinder are both mounted obliquely, with one end of the first double-horizontal-shaft mixing cylinder provided with the aggregate inlet being lower than an other end of the first double-horizontal-shaft mixing cylinder provided with the first discharging port, and one end of the second double-horizontal-shaft mixing cylinder provided with the mixture inlet being lower than an other end of the second double-horizontal-shaft mixing cylinder provided with the second discharging port.

3. The continuous asphalt mixture production plant based on double-horizontal-shaft forced mixing according to claim 1, wherein, the first double-horizontal-shaft mixing cylinder and the second double-horizontal-shaft mixing cylinder are each provided with two mixing shafts and the two mixing shafts rotate parallelly, synchronously and in opposite directions; wherein a plurality of feed mixing groups are arranged on each mixing shaft at intervals, and a return mixing group is arranged after every two successive feed mixing groups; each feed mixing group comprises a plurality of mixing arms vertically arranged at intervals along a same circumferential surface of the mixing shaft and feed blades mounted on the mixing arms; the return mixing group comprises a plurality of mixing arms vertically arranged at intervals along the same circumferential surface of the mixing shaft and return blades mounted on the mixing arms; the feed blades and the return blades are of a same structure and are mounted in opposite directions; and adjacent two groups of feed blades or adjacent feed blades and return blades on the mixing shaft are alternately arranged at intervals.

4. The continuous asphalt mixture production plant based on double-horizontal-shaft forced mixing according to claim 1, wherein, the continuous aggregate conveying and metering system comprises an aggregate belt conveyor, a full-floating weighing belt scale and an inclined belt conveyor, wherein an inlet of the aggregate belt conveyor is arranged below the cold aggregate bin, the full-floating weighing belt scale comprises a belt metering scale and a weighing sensor, and the belt metering scale is suspended on the weighing sensor, a feeding inlet of the belt metering scale is interfaced with an outlet of the aggregate belt conveyor, and a discharging port of the belt metering scale is interfaced with an inlet of the inclined belt conveyor.

5. The continuous asphalt mixture production plant based on double-horizontal-shaft forced mixing according to claim 1, wherein, the continuous asphalt metering and conveying system comprises an asphalt storage tank, a first asphalt pump, an intermediate transition metering hopper, a second asphalt pump and an asphalt flow meter, wherein the intermediate transition first metering hopper is arranged between the asphalt storage tank and the first double-horizontal-shaft mixing cylinder, an inlet pipeline is arranged between the asphalt storage tank and the intermediate transition metering hopper, an outlet pipeline is arranged between the intermediate transition metering hopper and the first double-horizontal-shaft mixing cylinder, the first asphalt pump and the second asphalt pump are respectively arranged on the inlet pipeline and the outlet pipeline, and the asphalt flow meter is arranged on the outlet pipeline between the second asphalt pump and the first double-horizontal-shaft mixing cylinder.

6. The continuous asphalt mixture production plant based on double-horizontal-shaft forced mixing according to claim 5, wherein, a front end of the inlet pipeline is connected with the asphalt storage tank, and a tail end of the inlet pipeline is connected with the intermediate transition metering hopper but does not contact with the intermediate transition metering hopper; and a front end of the outlet pipeline is connected with the intermediate transition metering hopper but does not contact with the intermediate transition metering hopper.

7. The continuous asphalt mixture production plant based on double-horizontal-shaft forced mixing according to claim 1, wherein, the continuous powder conveying and metering system comprises a powder storage tank, an auger feeder, a pneumatic butterfly valve, an intermediate transition metering hopper, a powder discharge screw conveyor and a powder metering screw scale; wherein a discharging port of the powder storage tank is connected with an inlet of the intermediate transition metering hopper through the auger feeder and the pneumatic butterfly valve; the powder discharge screw conveyor is obliquely arranged, an inclined lower end of the powder discharge screw conveyor is interfaced with the bottom of the intermediate transition metering hopper, and an inclined upper end of the powder discharge screw conveyor is interfaced with a feeding port of the powder metering screw scale; and a discharging port of the powder metering screw scale is connected with the first double-horizontal-shaft mixing cylinder.

8. The continuous asphalt mixture production plant based on double-horizontal-shaft forced mixing according to claim 1, wherein, the drying drum, the aggregate elevator, the first double-horizontal-shaft mixing cylinder, the second double-horizontal-shaft mixing cylinder and the finished product bin are all connected by flanges and are in communication with each other internally.

9. The continuous asphalt mixture production plant based on double-horizontal-shaft forced mixing according to claim 8, further comprising a dust collector, wherein, a burner is arranged on the drying drum, and a tail gas outlet is arranged on a top of the drying drum and is connected to the dust collector.

10. The continuous asphalt mixture production plant based on double-horizontal-shaft forced mixing according to claim 9, further comprising a control system, wherein, the control system is connected with the continuous aggregate conveying and metering system, the burner, the aggregate elevator, the double-horizontal-shaft continuous mixing host, the continuous asphalt metering and conveying system, the continuous powder conveying and metering system and the dust collector, respectively.

\* \* \* \* \*